Dec. 31, 1963  J. L. BLAKE  3,115,710
INDICATOR DEVICE
Filed March 28, 1960  2 Sheets-Sheet 1
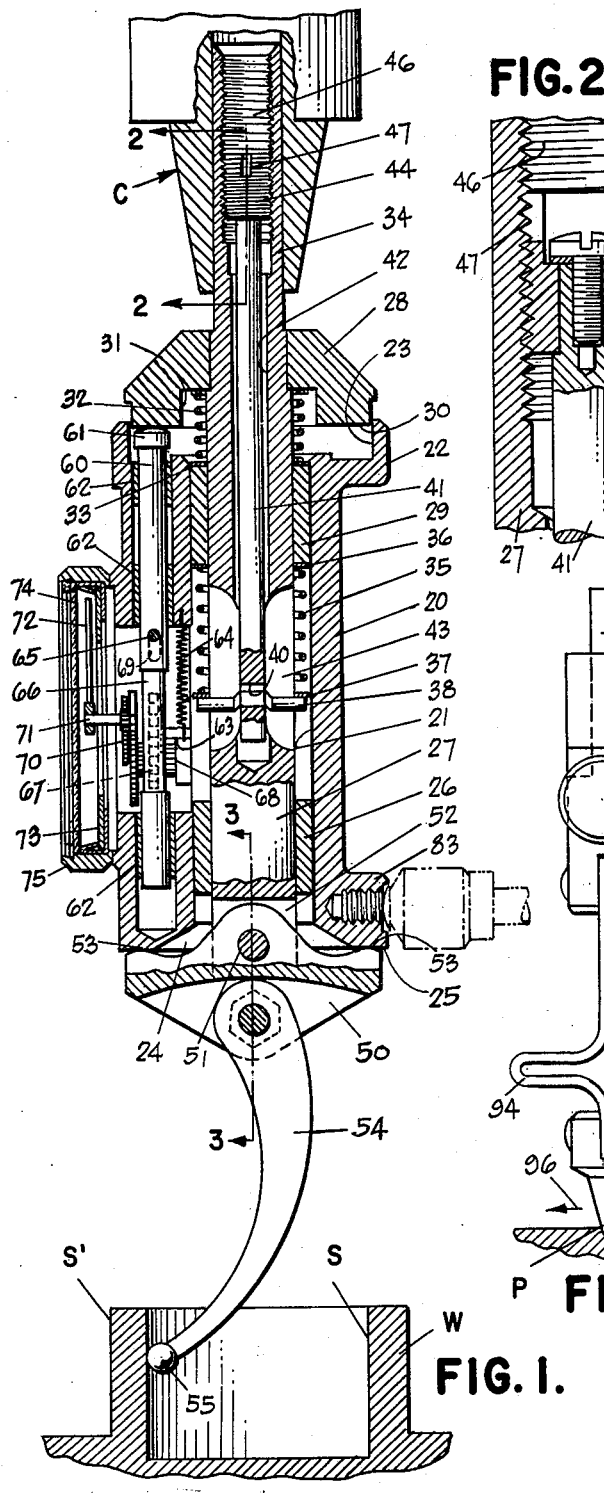
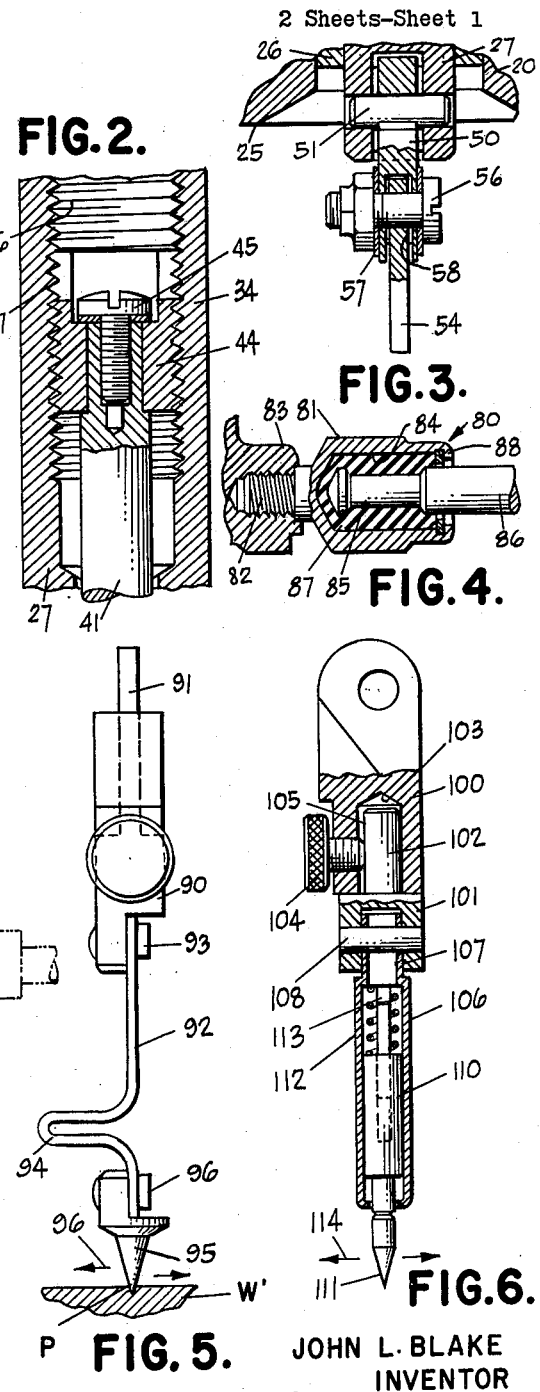
JOHN L. BLAKE
INVENTOR
BY
AGENT

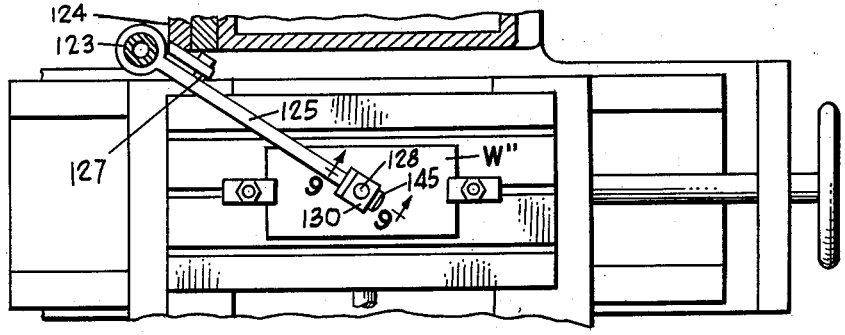
FIG. 7.
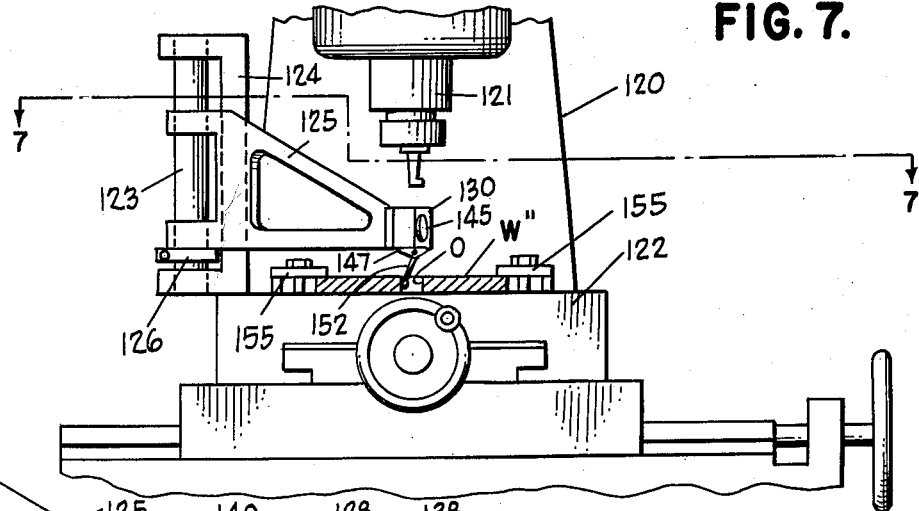
FIG. 8.
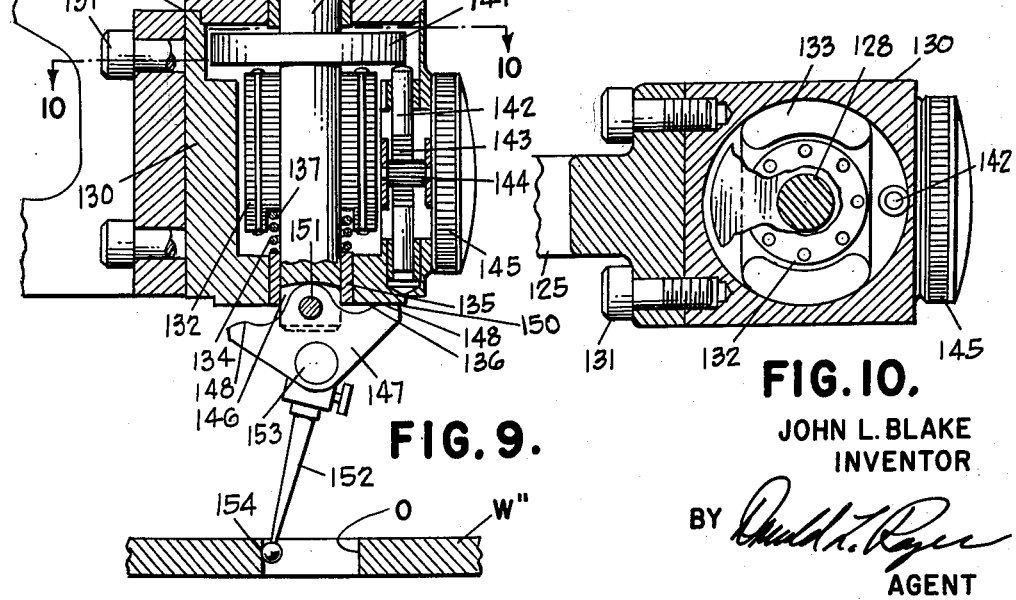
FIG. 9.
FIG. 10.
JOHN L. BLAKE
INVENTOR
BY
AGENT United States Patent Office 3,115,710
Patented Dec. 31, 1963

3,115,710
INDICATOR DEVICE
John L. Blake, 2500 Albert Way, Arcadia, Calif.
Filed Mar. 28, 1960, Ser. No. 18,186
4 Claims. (Cl. 33—172)

The present invention relates generally to an improved indicator device and relates more particularly to such a device for providing an extremely accurate indication as to the condition of a surface or alignment of a point or other physical structure relative to a fixed location.

The device of this invention is an improvement over the device of my Patent Number 2,814,124 issued November 26, 1957 and entitled "indicator Device."

It has long been desirable to provide means by which a determination may be made relative to the condition of a surface or point with reference to a fixed axis, line or point; or for determining axial misalignment of a machine spindle or a workpiece relative to a machine. Also, it is often desirable to enable location of a particular point relative to another object or rotating member. Such determinations may be used in making machine set-ups, in checking manufactured parts, or for determining the condition of various configurations.

As set forth in the references patent, extreme difficulty has been experienced heretofore in connection with the use of prior devices intended for accomplishment of similar determinations. Such prior structures have; however, been inaccurate, difficult to use or have also required that a considerable time be spent in the use thereof with known machinery. These factors all cooperate, not only to increase the cost of the articles being made by the machinery, but also are sufficiently inaccurate as to cause numerous rejected parts and inaccurate construction. Contemporary requirements, in connection with the manufacture of ever increasing smaller components of machinery and miniaturize structures, necessitate extreme accuracy of all steps of the manufacturing processes, thus creating the necessity for accurate tools, gauges, and indicators in accomplishing various machine operations.

Accordingly, the device of the present invention is an improved indicator and a simplified device for use in correcting positions of parts on a machine as, for example, a jig bore, milling machine, drill press and the like, and to approach concentricity of a part or feature by observing a range of travel of an indicator carried by a revolving spindle. Where it is desirable to locate a work-piece with a spindle being turned by hand rather than rotated under power, it is possible to establish the work-piece in an exact desired position through adjustment of machine table screws and shifting the work-piece and by repeating an indicator reading from two feeler positions arranged normal to each other. This is accomplished with the indicator dial remaining in any one of more desired positions for convenient reading. In positioning a drill press and the axis of rotation thereof over a part to be worked upon, the present device may also be used to advantage in aligning the axis of the drill press with a particular point or indicated position on the part.

While the indicator device of the referenced patent is completely satisfactory for use in many present instances, the improved device of this invention presents a more compact package, improved accuracy of obtained indicator readings, a reduction in the number of components hereof and adjustable counterbalance feature, in addition to a novel flexible restraining arm and point feeler mechanisms. All of these improved features cooperate to provide an instrument having wide versatility and a greater ease of use. Still further, the device of the present invention is such as to enable use of a modified form thereof as a permanent or removable attachment for a machine tool.

Additional utility of this device will be found in determining differing conditions and degrees of dissymmetry; for locating high and low areas of out-of-round conditions; detecting, locating and measuring surface taper with respect to axial travel of a spindle; and generally providing an effective indicator reading with an indicator shaft revolving unitarily with a machine spindle while a work-piece is maintained stationary. The present device may also be used in instances where both the spindle and the work-piece are revolving in the same direction of rotation and at different speeds.

It is, therefore, one important object of the present invention to provide an improved indicator device.

It is another object of the invention to provide an indicator device that utilizes a minimum of moving components, incorporates, integral structures, and which may be used with many different type of attachments.

Another object of the invention is to provide an improved indicator device that is operable at any rotary position thereof.

Still another important object of the invention is to provide a unique feeler mechanism for use with the present improved indicator device, the use of which enables determination of the position of a point on a surface and relative to an axis of a rotating spindle.

A further important object of the invention is to provide an improved indicator device and feeler combination mechanism wherein means are provided to permit a contact point to remain in contact with a slight indentation or mark in a surface when the point of contact is laterally displaced from the location of the axis of a rotating shaft or spindle.

A still further object of the invention is to provide an improved indicator device having novel means in combination therewith for adjustably counterbalancing the weight of the device and any attachments carried thereby.

A further object of the invention is to provide a novel means for rotatably operating the indicator device hereof whereby to enable use as a permanent or removable attachment to a machine tool.

Still another object of the invention is to provide an improved indicator device having a reduced number of components thereby requiring reduced machining and assembling time in the manufacture thereof.

Other and further important objects of the invention will become apparent from the disclosures in the following detailed specification, appended claims and accompanying drawings, wherein:

FIGURE 1 is a longitudinal sectional view of the present improved indicator device with parts in elevation and shown in conjunction with a suitable chuck and a workpiece;

FIG. 2 is an enlarged fragmentary sectional view of a portion of the indicator counterbalance mechanism as taken substantially as indicated by 2—2, FIG. 1;

FIG. 3 is a fragmentary sectional view of the feeler mounting mechanism as taken substantially as indicated by line 3—3, FIG. 1;

FIG. 4 is an enlarged fragmentary sectional view showing details of the construction of a flexible restraining arm employed with the present indicator device;

FIG. 5 is an elevational view of one type of a point feeler mechanism used with a present improved indicator device;

FIG. 6 is an elevational view, partially in section, showing another type of point feeler mechanism;

FIG. 7 is a plan view of a machine table showing a manner of use of the present indicator device as a permanent attachment to a boring machine, as taken substantially as indicated by line 7—7, FIG. 8;

FIG. 8 is an elevational view of the boring machine, adjustable table and present apparatus associated therewith;

FIG. 9 is an enlarged fragmentary sectional view of a form of the present invention as employed as a permanent attachment to a machine and as taken generally as indicated by line 9—9, FIG. 7; and FIG. 10 is a transverse sectional view through the form of the invention shown in and taken substantially as indicated by line 10—10, FIG. 9.

With reference to the drawings and with reference primarily to FIG. 1, the improved indicator device hereof includes a unitary housing 20 having a bore 21 therethrough. An upper end of the housing 20 has an outwardly flanged portion 22, there being a recess 23 in the flanged portion 22. The lower end of the housing 20 has a bevel 24 that cooperates with the lower end of the bore 21. The housing 20 has a lower end surface 25 that is positioned precisely normal to the axis of the housing, for a purpose to be hereinafter more fully described.

As shown in FIG. 1, a pair of spaced bearings 26 and 29 are disposed within the bore 25 and adapted for reception of a shaft 27. The shaft 27 is both rotatably and axially movable within the bearings 26 and 29. The shaft 27 has a flange member 28 secured thereto adjacent an upper end thereof. The flange member 28 has a diameter slightly less than the diameter of the recess 23 and has a lower surface 30 that is precisely normal to the axis of the shaft 27 and the housing 20. The surface 30 of the flange 28 is thus parallel to the surface 25 of the housing 20. The flange 28 is also provided with an internal recess 31, there being a compression spring 32 disposed between the base of the recess 31 and a thrust washer 33, the washer 33 being adapted for engagement with an axially upper end of the bearing 29. The shaft 27 has a reduced diameter shank 34 adapted for reception in and retention by a suitable chuck C.

In order to counterbalance the weight of the indicator and any attachments carried thereby, a counterbalance compression spring 35 is disposed between the shaft 27 and the body 20. In practice, the compression spring 35 has an upper end positioned in engagement with a thrust washer 36 which bears against a lower axial end of the bearing 27 and has a lower end positioned in contact with another thrust washer 37 that is carried by a transversely disposed pin 38. The pin 38 is positioned in a transverse opening 40 of a rod 41, the rod 41 being freely disposed in an axial bore 42 within the shaft 27. The pin 38 is disposed outwardly from the shaft 27 through radially extending slots 43 in the shaft 27. The spring 35 is thus retained within the housing bore 21.

In order to provide for adjustability of the force of the spring 35, a nut 44 is adjustably secured to the upper end of the rod 41 as by a screw 45, FIG. 2. The nut 44 threadably engages a threaded bore 46 in the upper end of the shaft shank portion 34. The nut 44 is slotted as at 47 to permit rotation thereof, such rotation being accomplished through use of a suitable screwdriver or similar tool and by loosening the screw 45, adjustably positioning the nut 44 and thereafter tightening the screw 45 to set the desired position of the nut 44 and the required compressive force of the spring 35.

As shown, the shaft 27 has an end portion that extends beyond the end surface 25 of the housing 20. A transversely disposed lever 50 is pivotally connected by means of a pin 51 within a bifurcation 52 in the extending end of the shaft 27. The lever 50 has oppositely disposed wing portions and arcuate edges 53 that are adapted to bear against the end surface 25 of the housing 20. The lever member 50 is also bifurcated for reception of various types of feeler or arm attachments, one type thereof being indicated at 54 and comprising an arcuate member having a bulbous end portion 55. The feeler member 54 is secured to the lever member 50 by means of a bolt and nut arrangement 56, there being suitable washers 57 positioned between the bolt head and a surface of the nut and an outer surface of the lever member 50. Additional washers 58 are positioned about the shank of the bolt and intermediate outer surfaces of the feeler 54 and the bifurcation in the lever member 50. It may thus be seen that the feeler member 54 is rigidly connected to the lever member 50 through a friction joint which provides for safety release in case of overload, with the lever member 50 being pivotally connected to the end of the shaft 27. As the feeler member 54 is moved in a lateral direction, the lever member 50 will be pivoted about the pin 51 and the action between the cam edges 53 and the end surface 25 will serve to move the housing 20 in an axial direction and against the compression of the spring 32, the flange member 28 also moving axially with the shaft 27.

As the housing 20 is moved axially with respect to the flange member 28, the rod 60 will likewise be moved with respect to the housing 20. The rod 60 has an end portion 61 that is positioned in an engagement with the surface 30 of the flange member 28. The rod 60 is mounted in the housing 20 in parallel spaced relationship to the shaft 27 and freely slideably carried in bearings 62 that are positioned in the housing. The rod 60 has a laterally extending pin 63 to which a tension spring 64 is attached, the other end of the tension spring being connected to the housing 20, thus to bias the end 61 of the rod 60 into contact with the surface 30 of the flange member 28. Another pin 65 carried by the rod 60 moves in a slot 69 in the rod 60 and serves to prevent rotation of the rod 60 within the bearing 62, thus maintaining proper alignment of the teeth of the rack on the rod 60.

The rod 60 is reduced in diameter as at 66 and has a rack 67 formed thereon. The rack 67 cooperates with a pinion gear 68 that is a portion of a gear train 70 having an output shaft 71 on which a pointer 72 is mounted. The pointer 72 cooperates with a suitable scale 73 of an indicator. The indicator has a cover glass 74 and a rotatable outer housing 75 which serves to permit manual disposition of the scale 73 relative to the pointer 72.

It may thus be seen that lateral movement of the feeler 54 will serve to move the indicator 72 whereby to provide an indication as to the amount of movement of the bulbous end portion 55 of the feeler 54.

When using the present indicator device, the body 20 is maintained in a stationary position radially while being allowed to move axially by means of an arm structure indicated generally at 80 in FIG. 4. The arm structure 80 includes a fitting 81 that has a threaded portion 82 that is adapted for threadable engagement with a boss 83 formed integrally from the housing 20. The fitting 81 has a recess 84 for reception of an inner end portion 85 of a rod 86. Resilient material such as rubber or the like indicated at 87 is disposed about the end portion 85 of the rod 86 and the inner surface of the recess 84, the material 87 being retained in position by means of an inwardly spun lip of the fitting 81 over and against a snap ring 88. The rod 86 is adapted for engagement with a stationary portion of the machine carrying the chuck C and is permitted slight resilient movement by its disposition in the material 87.

In use of the present device, the shank 34 of the shaft 27 is rotated by means of the chuck C, thus rotating the lever member 50 and the feeler 54. The particular weight of the indicator device non-rotating elements are counter-balanced as described hereinbefore by means of the spring 35. As the shaft 27 and feeler 54 rotate, the bulbous end 55 of the feeler is adapted for engagement with a surface S of a work-piece W. The work-piece W is mounted in a position on a table or the like and may then be adjustably positioned relative to the axis of the chuck C, an indication of such alignment being provided by the pointer 72 relative to the scale 73. It is to be understood that other feelers may be employed and may cooperate with either the inner surface S or an outer surface S' of a work-piece without departing from the spirit and scope of this invention.

The particular integral nature of the housing 20 and the relationship thereof with the indicator structure serves to provide a reduced weight structure and eliminates many otherwise required components. A counterbalance spring 35 also serves to support the weight of the housing 20 and mechanism carried thereby relative to the shaft 27, whereby to reduce the frictional forces that would otherwise be present between the arcuate cam surfaces 53 and the end surface 25 of the housing 20 and further to serve to reduce the contact pressure and resultant friction of the feeler ball 55 on the work-piece W. This reduction in frictional loads serves to enable an extremely accurate indication of movement of the bulbous end 55 of the feeler 54.

As shown in FIGS. 5 and 6, the device hereof may be utilized with additional feeler mechanisms whereby to establish the location of a point relative to the axis of a device such as the chuck C or other rotating or moving element. The feeler mechanisms of FIGS. 5 and 6 are adapted to replace the feeler 54 and to be secured to the lever member 50 in a manner similar to that described in connection with the feeler 54.

With reference to the form of the feeler shown in FIG. 5, this feeler includes a body portion 90 having a tab 91 that is adapted for disposition in the bifurcation of the lever 50 and for retention therein by means of the nut and bolt arrangement 56. A flexible arm portion 92 is secured to the body 90 as by a rivet or the like 93. The arm portion 92 is a leaf member, the wider lateral dimensions thereof being in the plane of the tab 91. The arm 92 is also provided with a laterally disposed folded portion 94 and is secured to a point member 95 as by rivet or the like 96. It may thus be seen that the point 95 is free to oscillate in the direction of the arrows 96 when a point P of a work-piece W' is disposed laterally from the axis of the feeler and the shaft 27. However, there is no freedom of movement for the point 95 or the arm 92 in a direction normal to the arrow 96. Thus, any movement of the point 95 in a direction normal to the arrows 96 will cause movement of the arm 50 and axial movement of the housing 20 relative to the shaft 27 and flange 28, thus to provide an indication of such movement of the indicator. The folded portion 94 serves to provide an axial bias of the point 95 toward the work-piece W' and retention of the point 95 in the point P.

Another form of the point locator feeler as shown in FIG. 6 and includes a body 100 similar to the body 90 and adapted for connection to the arm 50, also in a similar manner. A fitting 101 has a stem portion 102 adapted for disposition in a recess 103 in the body and retention therein by means of a thumb screw 104. The stem portion 102 may be flattened as at 105 to insure alignment of the fitting 101 relative to the body 100. A tubular arm 106 has a flattened portion 107 that is pivotally secured to the fitting 101 by means of a pin 108. The arm 106 axially slideably receives a pointer member 110 having a pointed end 111 that is biased toward a free end of the arm 106 by means of a compression spring 112 disposed about a guide member 113. The operation of the form of feeler shown in FIG. 6 is similar to that of the form shown in FIG. 5, movement thereof being restricted in the direction of the arrows 114 and free to move in a direction normal to the arrows 114.

It may thus be seen that through use of the type of feelers shown in FIGS. 5 or 6 a particular point may be located relative to the axis of a rotating shaft or spindle, an indication of a lateral displacement of the point from the axis of the rotating shaft being provided by movement of the pointer 72 relative to the scale 73.

With reference to the form of the invention shown in FIGS. 7 through 10 inclusive, and with particular reference to FIG. 9, it may be seen that the present indicator device is adapted for use in connection with a permanent, semi-permanent or removable installation on a machine such as a horizontal or vertical milling or boring machine, for example a jig borer. In this instance, a jig bore indicated generally at 120 and having a boring head 121 and an adjustable work supporting table 122, is provided with a shaft 123 that is disposed in spaced parallel relationship to the axis of the boring head 121. The shaft 123 is secured to the frame of the jig bore 120 by means of a bracket 124. An arm 125 is pivotally carried by a shaft 123 and adjustably disposed in the desired vertical position by means of a clamp 126. As shown in FIG. 7, the rotational position of the arm 125 relative to the shaft 123 is established by means of a set screw 127 that is carried by the bracket 124 and engages a lateral surface of the arm 125. The length of the arm 125, position of the shaft 123 and location of the set screw 127 are such as to dispose an axis of a rotatable shaft 128 carried by a housing 130 that is in turn secured to the outer end of the arm by means of screws 131, coincident with an axis of the boring head 121.

The shaft 128 forms a portion of the modified form of the present indicator device and carries an armature 132 forming a portion of an electric motor, the stator thereof being indicated at 133, FIG. 10. It may be seen that the shaft 128 and armature 132 are biased in an upward direction by means of a compression spring 134 that is disposed between a bearing 135, carried by a lower end portion 136 of the housing 130, and a recess 137 in an end of the armature 132. The shaft 128 has an upper end journalled in a bearing 138 that is carried by a cover member 140 which cooperates with the body 130. The shaft 128 also carries a flange member 141 that is adapted for cooperation with a rod 142 which, in turn, operates through a rack 143 and pinion 144 to operate a dial indicator 145.

In a manner similar to that described hereinbefore, the lower end of the shaft 128 is bifurcated as at 146, for pivotal reception and support of a lever 147. The lever 147 has laterally extending armed portions having cam surfaces 148 which cooperate with a planar surface 150 formed on the lower end of the body 130. The surface 150 is precisely normal to an axis of the shaft 128. The arm 147 is pivotally secured to the shaft 128 by means of a pin 151. Also, in a manner similar to that described herebefore, a feeler member 152 is secured to the arm 147 by means of a suitable securing member 153. The free end of the feeler 152 carries an enlargement 154 that is adapted for cooperation with an opening O in a work-piece W".

It may thus be seen that the work-piece W" may be initially attached to the table 122 by means of suitable clamps 155 and that the opening O may be precisely located with respect to the axis of the boring head 121, the rotary action of the indicator device being provided by a separate integral electric motor structure or other similar arrangement. Additional details of the motor structure including electrical leads and the like are well known and have not been included herein.

From the foregoing it may be seen that an improved indicator device has been provided wherein to provide compensating means for the recited disadvantages found in other prior indicators and to enable a precise indication of movement of various types of feeler members as associated with a work-piece, a point, an opening or a surface thereon.

Having thus described the invention and the present several embodiments thereof, it is desired to emphasize the fact that many further modifications may be resorted to in a manner limited only by a just interpretation of the following claims.

I claim:

1. An indicator device comprising: an elongated housing; a shaft rotatably journalled in said housing, said housing having a radially disposed end surface; a lever member pivotally secured to one end of said shaft and having at least one laterally disposed wing portion normally engageable with said end surface of said housing; a feeler member carried by said lever, said feeler member comprising a laterally flexible arm having a pointed end whereby to permit use in locating a point on a workpiece; a radially extending flange disposed outwardly from said shaft and adjacent an end of said housing remote from said end surface; a dial indicator carried by said housing and having an operating member disposed generally parallel to said axis of said shaft with an end thereof being adapted for sliding engagement with a radially extended surface of said flange, whereby to provide an indication of relative movement between said housing and said shaft; resilient means positioned about said shaft and acting between said shaft and said housing for balancing the weight of said housing and elements carried thereby; and means for limiting rotation movement for said housing when torque is applied to said shaft.

2. An indicator device according to claim 1 wherein said feeler member is laterally flexible in one lateral direction and rigid in a lateral direction normal to said first mentioned direction.

3. An indicator device comprising: an elongated housing; a shaft rotatably journalled in said housing, said housing having a radially disposed end surface; a lever member pivotally secured to one end of said shaft and having at least one laterally disposed wing portion normally engageable with said end surface of said housing; a feeler member carried by said lever; a radially extending flange disposed outwardly from said shaft and adjacent and end of said housing remote from said end surface; a dial indicator carried by said housing and having an operating member disposed generally parallel to said axis of said shaft with an end thereof being adapted for sliding engagement with a radially extending surface of said flange, whereby to provide an indication of relative movement between said housing and said shaft; resilient means positioned about said shaft and acting between said shaft and said housing for balancing the weight of said housing and elements carried thereby, said balancing means comprising a pair of springs, means for adjusting the force of at least one of said springs, said force adjusting means comprising an elongated rod disposed axially in said shaft and having laterally extending arms engageable with an end of said one spring, said rod being threadably connected with said shaft; and means for limiting rotational movement for said housing when torque is applied to said shaft.

4. An indicator device comprising: an elongated housing; a shaft rotatably journalled in said housing, said housing a radially disposed end surface; a lever member pivotally secured to one end of said shaft and having at least one laterally disposed wing portion normally engageable with said end surface of said housing; a feeler member carried by said lever; a radially extending flange disposed outwardly from said shaft and adjacent an end of said housing remote from said end surface; a dial indicator carried by said housing and having an operating member disposed generally parallel to said axis of said shaft with an end thereof being adapted for sliding engagement with a radially extending surface of said flange, whereby to provide an indication of relative movement between said housing and said shaft; means positioned about said shaft and acting between said shaft and said housing for balancing the weight of said housing and elements carried thereby; means for limiting rotational movement of said housing when torque is applied to said shaft; and electric motor means carried by and formed integrally with said shaft and said housing for rotating said shaft.

References Cited in the file of this patent

UNITED STATES PATENTS

| 2,734,277 | Dixon et al. | Feb. 14, 1956 |
| 2,799,941 | Emery | July 23, 1957 |
| 2,814,124 | Blake | Nov. 26, 1957 |
| 2,932,090 | Muller | Apr. 12, 1960 |

FOREIGN PATENTS

| 644,902 | Great Britain | Oct. 18, 1950 |